Patented Feb. 7, 1939

2,146,646

UNITED STATES PATENT OFFICE 2,146,646

VAT DYESTUFF PRINTING

Joseph Nüsslein, Otto Nicodemus, Walter Schmidt, and Bernhard Schacke, Frankfort-on-the-Main-Hochst, Germany, assignors to General Aniline Works, Inc., New York, N. Y., a corporation of Delaware No Drawing. Application August 6, 1936, Serial No. 94,688. In Germany September 7, 1934

10 Claims. (Cl. 8—70)

This invention relates to a process of printing with vat-dyestuffs and to vat-dyestuff preparations.

This application is a continuation-in-part of application Serial No. 39,070, filed September 3, 1935, in the name of Joseph Nüsslein, Otto Nicodemus, Walter Schmidt, and Bernhard Schacke.

In the art of printing with vat-dyestuffs the degree of dispersion of the dyestuff plays an important part in obtaining uniform results. Attention has been concentrated upon the production of a powder suitable for printing purposes, which has been dispersed as highly as possible by mechanical means and been mixed with a dispersing agent of strong action. Such powders may in some cases be introduced while stirring into the thickening, dissolved in water, without having previously been made into a paste with water, but in comparison with the aqueous paste the results are not very different. In order to obtain a good fixation, a high yield and level dyeing, additions of glycerin, thiodiglycol or sodium naphthalene-sulfonate must be made. It has also been proposed to use betaines or glucamines as such additions.

This invention is based on the observation that by using a sulfobetaine as an addition to the printing paste or as a component in the ready-made commercial product, containing, besides the finely or uniformly dispersed dyestuff, if desired, a dispersing agent or other addition, effects are obtained which are in many cases considerably superior to those obtained with the compounds named in the first paragraph hereof. A particular advantage is the possibility of incorporating the products in powders, since it thus becomes possible to market the dyestuffs in their powder form (which is of a high importance for the consumers) in a perfected state which could not hitherto be attained. Whether used as an admixture to the dyestuff or added to the printing pastes, the additions in question contribute to a good distribution of the dyestuffs, an easy and often very deep penetration of the fabric or yarn, a quick and fast fixation of the dyestuffs in level prints, a high yield and good shades. It is frequently desirable to mix two or more of the substances prescribed for use according to this invention, either with each other or with other known assistants. Their effect, like that of the assistants previously used, often varies considerably according to the particular dyestuffs used.

The new assistants may be used for all those kinds of cloth printing for which vat-dyestuffs may be used, for instance, for direct-printing, discharge-printing, and resist-printing on various fibres. They are also suitable as additions to printing colours, which are applied in the form of or with formation of free leuco-compounds.

Vat-dyestuffs are all those of the anthraquinone, indigo and quinone series, oxazoles, thiazoles and the like that may be transformed into compounds having an affinity to the fibre by means of the known reducing agents, such as hydrosulfurous acid or the salts thereof, sulfoxyl-compounds, organic and inorganic reducing agents.

The term "sulfobetaine" is used herein to mean compounds of structure analogous to that of the betaines, but differing therefrom in containing the grouping —SO$_2$—O—N instead of the grouping —CO—O—N present in the betaines.

Sulfobetaines suitable for use according to this invention may be made by heating an organic base having a tertiary nitrogen atom and a halogen-alkyl-sulfonic acid having the halogen and the sulfonic acid group in 1:2- or 1:3-positions, the addition product resulting from the reaction being transformed into a sulfobetaine with elimination of hydrogen halide.

Examples of compounds by which the results described may be attained are, for instance, the following:

The compound formed by the condensation of 1-chloro-2-hydroxypropane-3-sulfonic acid with pyridine (pyridinium-hydroxypropane-sulfobetaine) having probably the following constitution:

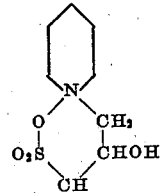

the compound formed by condensing quinoline with 1-chlorethane-2-sulfonic acid (quinoliniumethane sulfobetaine) having probably the formula

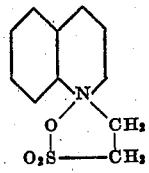

the compound resulting from triethylamine and 1-chloro-2-hydropropane-3-sulfonic acid (triethylamine-hydroxypropane-sulfobetaine) having probably the formula:

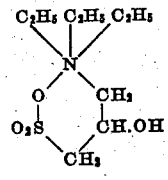

The following examples illustrate the invention, but they are not intended to limit the invention thereto, the parts being by weight:—

(1) 50 parts of tetrabromindigo are made into a homogeneous finely dispersed preparation together with 30 parts of dextrin and 20 parts of pyridinium-hydroxypropane-sulfobetaine. The mixture so produced may be readily introduced by stirring into 700 parts of an alkaline thickening usually consisting of

| | Parts |
|---|---|
| Wheat-starch-tragacanth thickening | 350 |
| Glycerol | 80 |
| Potassium carbonate | 120 |
| Sodium formaldehyde sulfoxylate of the formula $NaHSO_2CH_2O$ | 80 |
| Water | 70 |

200 parts of water are added and the printing color thus obtained is printed on cotton or viscose artificial silk by means of a printing machine. The printed material is then dried at about 60°–70° C., steamed in a rapid ager for about 3–5 minutes, subsequently oxidized, for instance, in a bath containing potassium bichromate and acetic acid, washed, soaped, washed again and dried. There is obtained an intense pure blue, highly level shade.

The pyridinium-hydroxypropane-sulfobetaine used in this example can be prepared by condensing α-chloro-β-hydroxypropane-γ-sulfonic acid with pyridine in excess by heating for several hours, hydrochloric acid being eliminated.

(2) An addition of 40 parts of pyridinium-hydroxypropane-sulfobetaine (see Example 1) to a printing colour which contains per 1000 parts 150 parts of the dyestuff obtainable according to Example 3 of U. S. Patent 1,651,461 considerably increases the printing power of the color on cotton and artificial silk (viscose artificial silk, cuprammonium artificial silk or mixed fabrics thereof) and materially shortens the duration of the fixation as compared with printing colors which contain instead of the aforesaid betaine a like quantity of sodium benzene-sulfonate, para-toluene sulfonic acid, ortho-aniline sulfonic acid or sodium α-naphthalene sulfonate.

(3) 40 parts of pyridinium ethane-sulfobetaine which is prepared analogously to the pyridinium-hydroxypropane-sulfobetaine from pyridine and chlorethane sulfonic acid, are added to a printing colour which contains per 1000 parts 60 parts of the dyestuff No. 1,265, (Schultz Farbstofftabellen, 7th ed.). Thereby its tinctorial strength on cotton and artificial silk (viscose artificial silk, cuprammonium artificial silk or mixed fabrics thereof) is distinctly enhanced and the fixation is considerably improved (after 3 minutes steaming the fixation is practically finished) in comparison with prints obtained without the said addition and with the same quantities of sodium benzene-sulfonate, ortho-aniline sulfonic acid or sodium α-naphthalene sulfonate.

(4) By addition of 40 parts of pyridinium-hydroxypropane-sulfobetaine (see Example 1) to a printing color containing per 1000 parts 120 parts of the dyestuff No. 1,262 (Schultz Farbstofftabellen, 7th ed.) fuller prints are obtained on cotton and still more intense prints on artificial silk (viscose artificial silk, cuprammonium artificial silk or mixed fabrics thereof) during a much shorter time or fixation than when printing colors are used which contain instead of the above sulfobetaine a like quantity of sodium benzene-sulfonate, para-toluene-sulfonic acid, ortho-aniline-sulfonic acid or sodium α-naphthalene-sulfonate.

(5) By addition of 20 parts of quinoline-hydroxypropane-sulfobetaine (which is prepared, analogously to the pyridinium-hydroxypropane-sulfobetaine, from quinoline and 1-chloro-2-hydroxypropane-3-sulfonic acid) to a printing color which contains per 1000 parts 150 parts of the dyestuff obtainable according to Example 3 of U. S. Patent No. 1,651,461 the tinctorial strength is considerably improved on cotton, and even more so on artificial silk (viscose artificial silk, cuprammonium artificial silk or mixed fabrics thereof). The speed of fixation is likewise enhanced.

(6) A printing color containing 150 parts of the dyestuff obtainable by condensation of 1-amino-5-benzoylamino-anthraquinone with 5-benzoylamino-1-chloroanthraquinone and further treatment of the dianthrimide so obtained with a dehydrating agent according to the process of British specification No. 29,352 of 1910, Example C, and an addition of 20 parts of the sulfobetaine mentioned in the foregoing example yields on cotton and artificial silk (viscose artificial silk, cuprammonium artificial silk or mixed fabrics thereof) prints which are much more intense and have a considerably enhanced speed of fixation as compared with those produced without the addition of the sulfobetaine.

(7) Cotton and viscose artificial silk materials preprinted with a printing colour containing per kilo 200 grams of the dyestuff described in British specification No. 29,352 of 1910, Example C, with the addition of 30–60 grams of ethanoldiethylamine-oxypropane-sulfobetaine. Much fuller printing effects are obtained in deep as well as in light shades than without the said addition.

(8) Cotton and viscose artificial silk materials are printed with a printing color which contains per kilo 80 grams of the dyestuff No. 1,234 (Schultz, Farbstofftabellen, 7th ed.) and an addition of 30–80 grams of ethanoldiethylamine-oxypropane-sulfobetaine. The tinctorial strength is considerably enhanced by the addition of the sulfobetaine.

We claim:

1. The process of textile printing with vat dyestuff pastes comprising a sulfobetaine having the characteristic grouping:

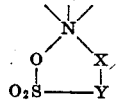

wherein X—Y stands for a member of the group consisting of aliphatic hydrocarbon radicals and aliphatic hydrocarbon radicals containing hydroxyl, the radicals having from 2 to 3 carbon atoms and forming a straight chain of carbon atoms.

2. The process of textile printing with vat-dyestuff pastes comprising a sulfobetaine of the general formula:

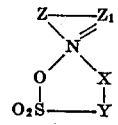

wherein

stands for a member of the group consisting of pyridine, quinoline, substituted pyridine and substituted quinoline, X—Y stands for a member of the group consisting of aliphatic hydrocarbon radicals and aliphatic hydrocarbon radicals containing hydroxyl, the radicals having from 2 to 3 carbon atoms and forming a straight chain of carbon atoms.

3. Vat-dyestuff preparations containing a sulfobetaine having the characteristic grouping:

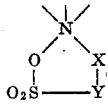

wherein X—Y stands for a member of the group consisting of aliphatic hydrocarbon radicals and aliphatic hydrocarbon radicals containing hydroxyl, the radicals having from 2 to 3 carbon atoms and forming a straight chain of carbon atoms.

4. Vat-dyestuff preparations containing a sulfobetaine of the general formula:

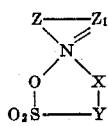

wherein

stands for a member of the group consisting of pyridine, quinoline, substituted pyridine and substituted quinoline, X—Y stands for a member of the group consisting of aliphatic hydrocarbon radicals and aliphatic hydrocarbon radicals containing hydroxyl, the radicals having from 2 to 3 carbon atoms and forming a straight chain of carbon atoms.

5. The process of textile printing with vat-dyestuff pastes which consists in the application to the fiber of a vat dye paste comprising a vat dye and a sulfobetaine of the formula:

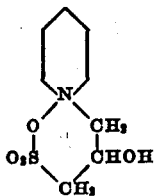

6. The process of textile printing with vat-dyestuff pastes which consists in the application to the fiber of a vat dye paste comprising a vat dye and a sulfobetaine of the formula:

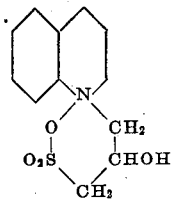

7. The process of textile printing with vat-dyestuff pastes which consists in the application to the fiber of a vat dye paste comprising a vat dye and a sulfobetaine of the formula:

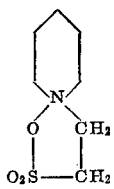

8. Vat-dyestuff preparations containing the sulfobetaine of the formula:

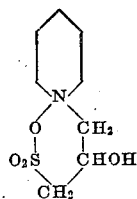

9. Vat-dyestuff preparations containing the sulfobetaine of the formula:

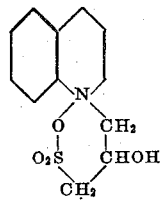

10. Vat-dyestuff preparations containing the sulfobetaine of the formula:

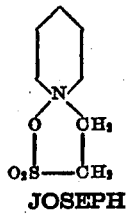

JOSEPH NÜSSLEIN.
OTTO NICODEMUS.
WALTER SCHMIDT.
BERNHARD SCHACKE.